United States Patent [19]

Grasdepot

[11] Patent Number: 5,009,107
[45] Date of Patent: Apr. 23, 1991

[54] OPTICAL PRESSURE SENSOR AND A METHOD AND APPARATUS FOR MAKING SUCH A SENSOR

[75] Inventor: François Grasdepot, Paris, France

[73] Assignee: Schlumberger Industries, Montrouge, France

[21] Appl. No.: 472,537

[22] Filed: Jan. 30, 1990

[30] Foreign Application Priority Data

Feb. 2, 1989 [FR] France ............................ 89 01361

[51] Int. Cl.$^5$ .............................................. G01L 7/04
[52] U.S. Cl. .................................. 73/705; 250/227.14; 250/231.19
[58] Field of Search ............................ 73/705, 729; 250/231.19, 231.1, 227.14

[56] References Cited

U.S. PATENT DOCUMENTS 3,273,447  9/1966  Frank ..................................... 73/705
4,612,810  9/1986  Martens ........................... 250/231.19

Primary Examiner—Donald O. Woodiel
Attorney, Agent, or Firm—Sanford J. Asman

[57] ABSTRACT

An optical absolute pressure sensor constituted by a body made of a substance having photoelastic properties and provided with at least one internal duct extending parallel to the longitudinal direction of said body, the pressure inside said duct being substantially zero and the ends thereof being closed in sealed manner. The invention also applies to a method of making the sensor, to apparatus for implementing the method, and to a sensor constituting the product of the method.

6 Claims, 1 Drawing Sheet

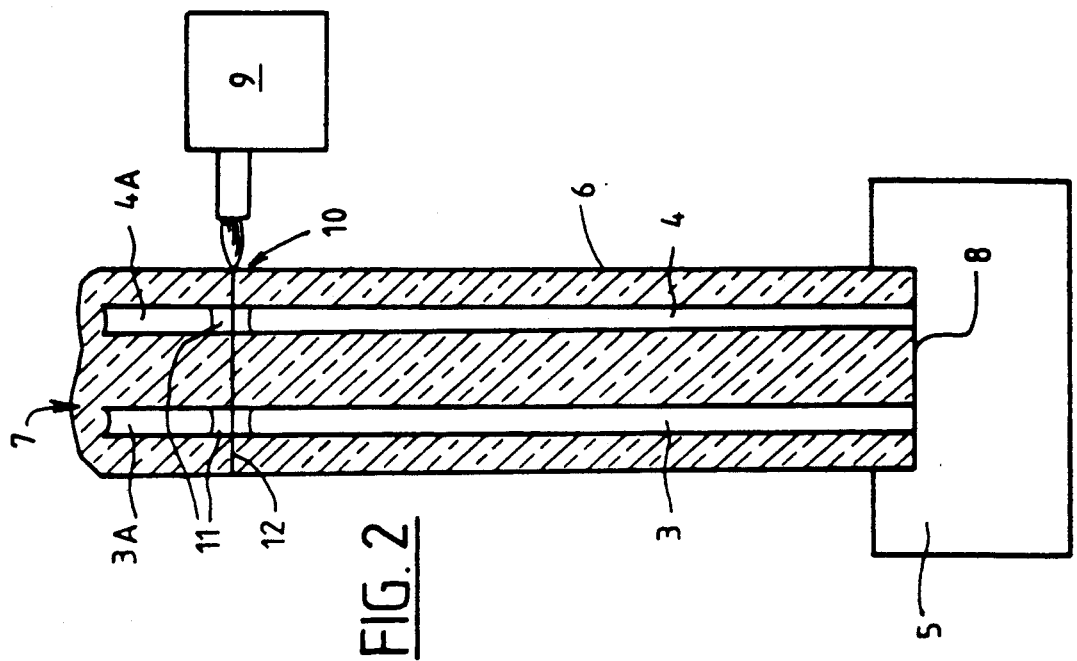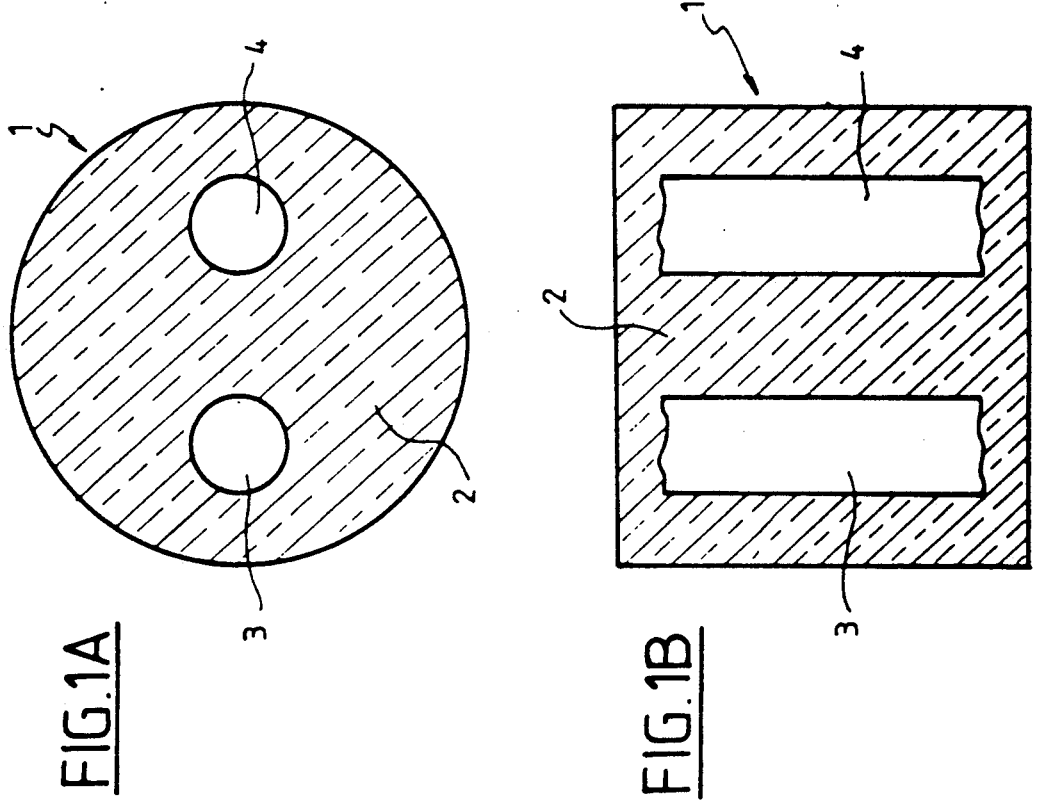

OPTICAL PRESSURE SENSOR AND A METHOD AND APPARATUS FOR MAKING SUCH A SENSOR

The present invention relates to an optical pressure sensor in the form of a cylindrical body of transparent material (such as glass) having photoelastic properties and provided with at least one, and preferably two, internal hollow ducts running parallel to the longitudinal axis of the body. The invention also relates to a method and to an apparatus for making such a sensor.

BACKGROUND OF THE INVENTION

When such a body is subjected to a given pressure, anisotropic stresses are established which generate a birefringence effect by photoelasticity. The birefringence of an incident light ray (running longitudinally through the body) increases with pressure.

An article published in the periodical Optic Letters, Vol. 11, No. 5, May 1986, entitled "Side-hole fiber for fiber-optic pressure sensing" by M. H. Xie, Ph. Dabkiewicz, R. Ulrick, and K. Okamoto, describes a sensor used for measuring pressure and constituted by a glass optical fiber provided with longitudinal internal ducts. The variation in the birefringence of an incident light ray is measured, which birefringence increases with increasing pressure $P_i$ inside the ducts. In a variant, a constant pressure is maintained inside the ducts and the pressure to be measured is applied to the outside of the fiber.

Because of the difference in thermal expansion coefficients between the two component portions of such a prior sensor, namely its core (the central portion), and its optical cladding (its peripheral portion), the sensor is sensitive to temperature.

In addition, the sensor is sensitive only to relative pressure.

Further, since the polarizers disposed at each end of the optical fiber are not subjected to pressure, the sensor is subject to metrological disturbances.

All of these difficulties reduce the advantages of such a sensor and the fields in which it can be used.

A pressure sensor has also been described, for example in German patent publication No 34 05 026, particularly for measuring differential pressure, which comprises a light transparent cylindrical body sensitive to the pressure of a fluid, liquid or gas, which is admitted in longitudinally extending cavities within this body. The cavities are closed at either end of the cylindrical body by sealing plates. These plates may be glued to the transparent body. These plates may also be made out of metal and clamped together against the ends of the cylindrical body by means of bolts. Each of these plates mounts sealing elements around the cavity openings in each end of the cylindrical body.

As in the case of the optical fiber sensor mentioned above, this sensor is sensitive only to relative pressure.

In addition, the junction between the sealing plates and the transparent sensor body gives rises to differential thermal dilatations which generate parasitic stresses in the sensor body. Furthermore this junction is also a cause for a lack of long term stability of the sensor. An object of the invention is to provide an optical sensor of absolute pressure and suitable for substantially mitigating or even completely eliminating the above-mentioned drawbacks and undesirable effects.

SUMMARY OF THE INVENTION

To this end, the present invention provides an absolute pressure sensor provided with at least one longitudinal internal duct and constituted by a cylindrical body of given length (in the longitudinal direction), made of a material having photoelastic properties, with the pressure existing inside the duct being substantially zero, said duct being closed at both ends by sealing without addition of external material, such as by fusion of the end walls of such duct.

Thus, the sensor of the invention serves firstly to provide an absolute measurement, and secondly it is substantially insensitive to temperature given its structural uniformness. Further, a sensor of the invention may be disposed together with its inlet and outlet polarizers inside the enclosure subjected to the pressure that is to be measured.

Further, although the method of making a relative or differential pressure sensor does not give rise to major problems in manufacture since a pressure of known value (or of a value which can be determined) exists inside the ducts, the same does not apply to making an absolute pressure sensor which requires a vacuum to be established inside its ducts.

A first manufacturing problem consists in obtaining a uniform sensor having photoelastic characteristics which are independent of the manufacturing method, and a second problem consists in hermetically sealing the ends of each duct while obtaining a vacuum therein.

The invention also provides a method of making an absolute pressure sensor, and suitable for solving the two above- mentioned problems To this end, the present invention provides a method of making an optical pressure sensor from a cylindrical body made of a substance having photoelastic properties, the body being provided with at least one internal duct having a longitudinal axis and opening out at two respective ends of the body, the method comprising the following steps:

(1) the duct(s) is/are closed at a first end
(2) a second end of said body is connected to means suitable for establishing a vacuum in the duct(s);
(3) heat is applied externally to a zone of the body at which the duct(s) is/are to be closed, the quantity of heat applied being sufficient to melt the body-forming substance in said zone;
(4) the body is allowed to cool; and
(5) the body is cut on a right section running through the closed portions of the duct(s) and corresponding to the second end of the body of the sensor which is to be obtained.

Advantageously, the method also includes a final step of polishing the face corresponding to said right section.

During step 3, the heat melts the glass at the inside wall of the duct(s), and under the effect of the differential pressure due to the vacuum, this wall collapses and seals up said duct(s).

As a result, a very reliable and strong optical pressure sensor is obtained cheaply and quickly. Its ends do not include any glue (having limited ability to withstand temperature), and they are uniform with the remainder of the body.

For a heat source at a given temperature, the length of the "collapsed" portion, and thus the length of the ducts, is a function of the time during which heat is applied.

During step 1, the respective first ends of the ducts are advantageously closed by thermal sealing.

BRIEF DESCRIPTION OF THE DRAWING

An embodiment of the invention is described by way of example with reference to the accompanying drawing, in which:

FIGS. 1A and 1B are respectively a cross-section and a longitudinal section through a sensor of the invention; and FIG. 2 is a diagrammatic section through a apparatus for implementing the method of the invention.

MORE DETAILED DESCRIPTION

The sensor shown in cross-section and in longitudinal section in FIGS. 1A and 1B respectively is constituted by a cylindrical body 2 with a circular base made of glass (or any other transparent material having properties of photoelasticity), with the body being 10 mm long for example, and 12 mm in diameter for example. Two parallel internal cylindrical ducts 3 and 4 having longitudinally-extending axes are provided inside the body 2 parallel to and symmetrically arranged with respect to its axis, and there is a vacuum inside each duct.

The apparatus shown in FIG. 2 constitutes an example of apparatus for implementing the method of the invention and suitable for establishing a vacuum inside the internal ducts 3 and 4.

The first ends of the ducts 3 and 4 are closed by sealing the first end 7 of the body 6, for example, and preferably by fusion with application of heat.

Means for establishing a vacuum inside the internal ducts 3 and 4 in a cylindrical glass body 2, e.g. a vacuum pump 5, are connected to the second end 8 of the body 2 in such a manner as to allow the open second ends of the ducts 3 and 4 to communicate with the said pump 5.

In order to make a sensor constituted by a segment of given length (in the longitudinal direction) of the cylindrical body, the outside of the body 6 is heated locally in a zone 10 by conventional heater means, said zone being situated at a distance from the sealed first end 7 corresponding to the desired length for the body segment that is to constitute the pressure sensor.

The substance constituting the body softens and melts in the zone 10, and in particular the inside walls of the ducts 3 and 4 melt, and as a result these inside walls "collapse" and merge under the effect of the vacuum inside the ducts, thereby closing the ducts and constituting seals 11. There continues to be a vacuum inside the closed-off duct segments 3A and 4A.

The body is allowed to cool, after which it is cut on a cross-section 12 running substantially through the middle of the collapsed zone 10 of the ducts that have been heated.

The two transverse faces constituting the ends of the body segment are then polished.

The length (in the longitudinal direction) of the collapsed portions, which length determines the total length of the ducts, is a function (for a given material and for given body dimensions) of the quantity of heat delivered to the body in the "closure" zone 10.

For example, for a body segment made of the substance sold under the trademark Pyrex, having a length of 1 meter, a diameter of 12 mm, and provided with ducts each having a diameter of 3 mm, applying a flame at 650° C. for a period of 30 seconds gives rise to a "closure" zone 10 which is 5 mm long.

I claim:

1. An optical absolute pressure sensor constituted by a body made of a substance having photoelastic properties and provided with at least one internal duct extending parallel to the longitudinal direction of said body, the pressure inside said duct being substantially zero and the ends thereof being closed by sealing without addition of external material.

2. A sensor according to claim 1, wherein at least one of the ends of the duct is sealed by fusion of its end walls together.

3. A sensor according to claim 1, wherein the sensor is in the form of a circular cylinder including two parallel internal ducts.

4. A method of making an optical pressure sensor from a cylindrical body made of a substance having photoelastic properties, the body being provided with at least one internal duct having a longitudinal axis and opening out at two respective ends of the body, the method comprising the following steps:

(1) the duct(s) is/are closed at a first end;
(2) a second end of said body is connected to means suitable for establishing a vacuum in the duct(s);
(3) heat is applied externally to a zone of the body at which the duct(s) is/are to be closed, the quantity of heat applied being sufficient to melt the body-forming substance in said zone;
(4) the body is allowed to cool; and
(5) the body is cut on a right section running through the closed portions of the duct(s) and corresponding to the second end of the body of the sensor which is to be obtained.

5. A method according to claim 4, including a final step of polishing the face corresponding to said right section.

6. A method according to claim 4, wherein the duct(s) is/are sealed at the first end by thermal sealing.

* * * * *